United States Patent
Schaedler et al.

(10) Patent No.: US 6,230,608 B1
(45) Date of Patent: May 15, 2001

(54) VACUUM ACTUATED CONTROL MECHANISM

(75) Inventors: Axel Schaedler, North Royalton; John Robertson, Berea, both of OH (US)

(73) Assignee: MTD Products Inc, Cleveland, OH (US)

( * ) Notice: Subject to any disclaimer, the term of this patent is extended or adjusted under 35 U.S.C. 154(b) by 0 days.

(21) Appl. No.: 09/299,349

(22) Filed: Apr. 26, 1999

Related U.S. Application Data

(62) Division of application No. 08/994,665, filed on Dec. 19, 1997, now Pat. No. 5,911,672.
(60) Provisional application No. 60/053,723, filed on Jul. 25, 1997.

(51) Int. Cl.[7] .................................................. F15B 11/08
(52) U.S. Cl. ............................................... 91/445; 91/465
(58) Field of Search .............................. 91/445, 459, 465, 91/469, 462, 444; 60/397

(56) References Cited

U.S. PATENT DOCUMENTS

| | | | |
|---|---|---|---|
| 2,287,179 | * 6/1942 | Kocher | 60/397 |
| 2,323,519 | * 7/1943 | Dean | 60/397 |
| 2,906,292 | * 9/1959 | Mayo | 60/397 |
| 3,656,595 | 4/1972 | Gethmann et al. | 192/13 R |
| 3,901,342 | 8/1975 | Nunn, Jr. | 180/79.2 R |
| 4,006,580 | 2/1977 | Kalleicher | 56/17.2 |
| 4,364,301 | 12/1982 | Kawabata et al. | 91/20 |
| 4,388,856 | 6/1983 | Cook | 91/49 |
| 4,395,865 | 8/1983 | Davis, Jr. et al. | 56/13.3 |
| 4,515,066 | * 5/1985 | Ito et al. | 91/454 |
| 4,580,669 | 4/1986 | Marto | 192/3.54 |
| 4,622,859 | 11/1986 | Hobson | 74/15.88 |
| 4,669,361 | 6/1987 | Ito et al. | 91/459 |
| 4,799,418 | 1/1989 | Takahashi et al. | 91/449 |
| 4,831,915 | 5/1989 | Roach | 92/49 |
| 4,835,949 | 6/1989 | Seyerle | 56/10.8 |
| 5,138,825 | 8/1992 | Trefz et al. | 56/11.1 |
| 5,259,175 | 11/1993 | Schmidt | 56/17.2 |
| 5,321,910 | 6/1994 | Legendre et al. | 49/324 |
| 5,321,938 | 6/1994 | LeBlanc | 56/6 |
| 5,335,487 | 8/1994 | Murakawa et al. | 56/10.5 |
| 5,351,467 | 10/1994 | Trefz et al. | 56/16.3 |
| 5,353,578 | 10/1994 | Irby et al. | 56/11.1 |
| 5,381,648 | 1/1995 | Seegert et al. | 56/17.1 |
| 5,477,642 | 12/1995 | Legendre | 49/340 |
| 5,526,633 | 6/1996 | Strong et al. | 56/17.2 |
| 5,528,886 | 6/1996 | Esau | 56/14.9 |
| 5,529,135 | 6/1996 | Wenzel et al. | 180/6.24 |
| 5,636,444 | 6/1997 | Nickel | 30/276 |

FOREIGN PATENT DOCUMENTS

| | | | |
|---|---|---|---|
| 9145631 | 8/1984 | (JP) | B60K/25/02 |
| 2-21827 | 2/1990 | (JP) | A01D/34/00 |

\* cited by examiner

*Primary Examiner*—Edward K. Look
*Assistant Examiner*—Thomas E. Lazo
(74) *Attorney, Agent, or Firm*—Emerson & Skeriotis; Roger D. Emerson; Timothy D. Bennett

(57) ABSTRACT

A riding lawn mower is provided that has an engine, a device that requires control and a vacuum actuated control mechanism for controlling the device. The vacuum actuated control mechanism includes a vacuum actuator having first and second chambers separated by a movable membrane, first connecting means for operatively connecting the vacuum actuator to the device, vacuum means for providing a vacuum to the vacuum actuator, activating means for selectively activating the vacuum actuator and securing means for securing the vacuum actuator in place. The securing means also secures the device in place.

14 Claims, 7 Drawing Sheets

VACUUM ACTUATED CONTROL MECHANISM

The applicant for this Divisional Application hereby claims priority from Utility Application Ser. No. 08/994,665, now U.S. Pat. No. 5,911,672 filed Dec. 19, 1997 which itself claims priority from Provisional Application No. 60/053,723 filed Jul. 25, 1997.

BACKGROUND OF THE INVENTION

1. Field of Invention

This invention pertains to the art of methods and apparatuses for vacuum actuators, and more specifically to methods and apparatuses for using vacuum actuators to control systems in a lawn mower such as to control the height of a mower deck and to control the speed of the lawn mower.

2. Description of the Related Art

It is well known to provide riding lawn mowers with control devices for various mechanisms on the mower. For example U.S. Pat. No. 5,351,467 to Trefz et al. discloses an apparatus for suspending, raising and lowering a cutting deck that is held beneath a riding lawn mower. Trefz et al. discloses a foot pedal for use in adjusting the height of the cutting deck. A suspending assembly is also provided for the additional adjustment of the height of the cutting deck. Thus cumbersome hand and foot manipulation is required to adjust the height of the cutting mechanism of this disclosure. It is also known in the art to provide complex and expensive hydraulic systems for adjusting mower decks. What is needed is an easy yet inexpensive and relatively simple apparatus and method for adjusting the height of a mower deck having infinite adjustability within a given range.

U.S. Pat. No. 5,353,578 to Irby et al. discloses a drive system for lawn mowers. The drive system includes a speed control mechanism and is intended for a walk-behind mower. Manual adjustment of a lever is required to adjust this drive system. It is also known in the art to provide for complex and relatively expensive systems for controlling the speed of a riding lawn mower. What is needed is an easy relatively inexpensive method and apparatus for controlling the speed of a riding lawn mower having infinite adjustability within a given range.

The present invention provides methods and apparatuses for using a vacuum actuator to control a device associated with the lawn mower. A vacuum actuated control mechanism can be used for controlling the height of a mower deck. A vacuum actuated control mechanism can also be used to control the speed of a riding lawn mower.

SUMMARY OF THE INVENTION

In accordance with one aspect of the present invention, a vacuum actuated control mechanism is provided for controlling an associated device. The vacuum actuated control mechanism includes a first vacuum actuator, first connecting means for operatively connecting the first vacuum actuator to the associated device, vacuum means for providing a vacuum to the first vacuum actuator, activating means for selectively activating the first vacuum actuator, and securing means for securing the first vacuum actuator in place.

In accordance with another aspect of the present invention the activating means includes first and second switching means for selectively permitting air flow between the first vacuum actuator and the vacuum means. The activating means also includes a rocking switch for selectively activating the first and second switching means and vacuum lines for communicating the vacuum means to the first and second switching means and for communicating the first and second switching means to the first vacuum actuator.

In accordance with another aspect of the present invention the securing means includes third and fourth switching means for selectively permitting air flow between the first vacuum actuator and the first and second switching means. The rocking switch selectively activates the third and fourth switching means.

In accordance with still another aspect of the present invention a method for controlling an associated device is provided. The method includes the steps of removing vacuum from a first chamber in a vacuum actuator, establishing a vacuum within a second chamber of the vacuum actuator, and moving the associated device.

In accordance with yet another aspect of the present invention another method for controlling an associated device is provided. The method includes the steps of removing vacuum from a first vacuum actuator, establishing a vacuum within a second vacuum actuator, and moving the associated device.

One object of the present invention is to provide a vacuum actuated control mechanism that can easily and quickly be mounted to a riding lawn mower.

Another object of the present invention is to provide a vacuum actuated control mechanism that can secure the vacuum actuators thereby securing the device being controlled in place.

Another object of the present invention is to provide a control mechanism that is inexpensive and yet greatly reduces the need for human manipulation of controls.

It is still another object of the present invention to provide a vacuum actuated control mechanism for controlling the height of the mower deck mounted to a riding lawn mower.

It is a further object of the present invention to provide a vacuum actuated control mechanism for controlling the speed of a riding lawn mower.

Still other benefits and advantages of the present invention will become apparent to those skilled in the art upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part hereof and wherein.

DESCRIPTION OF THE PREFERRED EMBODIMENT

Figure 1:
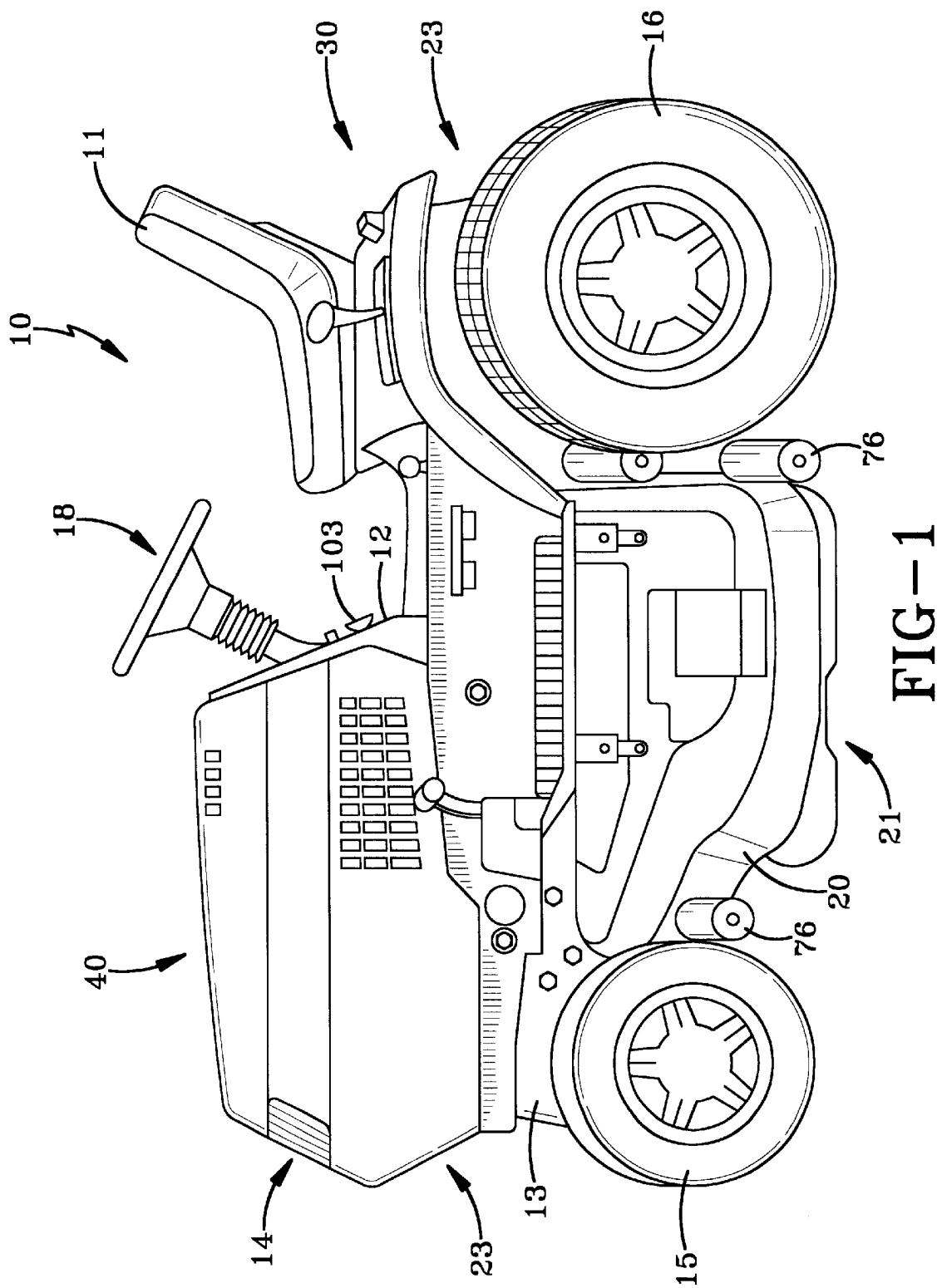
FIG. 1 is a perspective elevation view of a typical riding lawn mower that is equipped with the vacuum actuated control mechanism of the present invention.
Figure 2:
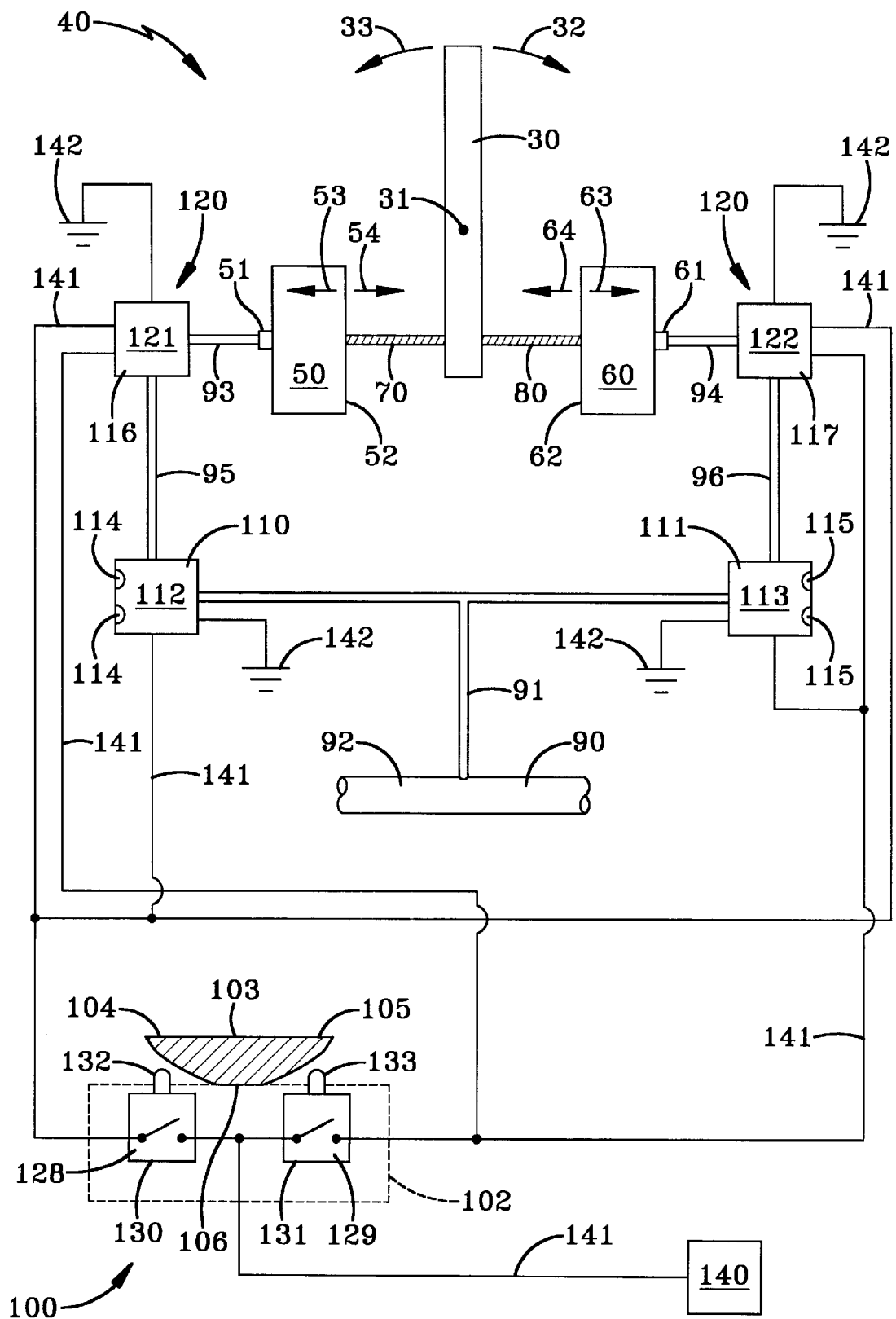
FIG. 2 is a schematic representation of the vacuum actuated control mechanism showing how a device on the riding mower can be controlled.

Referring now to the drawings wherein the showings are for purposes of illustrating a preferred embodiment of the invention only and not for purposes of limiting the same, FIG. 1 shows a riding mower 10 which is equipped with a vacuum actuated control mechanism 40 in accordance with this invention. This preferred embodiment is directed to a riding lawn mower but the invention is applicable to other mowers, other vehicles and other applications as well. The riding mower 10 includes an operator seat 11, a control panel 12, a frame 13, a steering implement 18 for turning front wheels 15 and an engine 14. The engine 14 can be of any type currently used in the art but preferably it includes a vacuum means 90 such as an intake manifold 92 as shown in FIG. 2. It should be noted that other vacuum means can also be used for this invention. The engine 14 is used, as is commonly known in the art, to provide power to a differential 23 that then provides power to the back wheels 16 for driving the riding mower 10. The engine 14 is also used, as is commonly known in the art, to drive cutting blades, shown representatively as 21, which rotate within a mower deck that itself is supported by deck rollers 76 and the frame 13 of the riding mower 10. The cutting blades 21 can be of any type currently known in the art and thus are not shown in detail.

Referring to FIGS. 1–2, the riding mower 10 also has a device 30 that can be any device chosen with sound engineering judgement requiring control. The device 30 may be, for example, a lever (as shown in FIG. 2), a cable, a rod or any other such member as required. In particular, disclosed below is a vacuum actuated control mechanism 41 (see FIGS. 3–4) for controlling the height of the mower deck 20 and three vacuum actuated control mechanisms 42, (referenced as 42a, 42b and 42c, see FIGS. 5–6 and 8–10) for controlling the speed of the riding mower 10. Other applications would include the height adjustment of a snow blower chute (not shown) or to adjust the operator seat 11 or many other applications as well.

Still referring to FIGS. 1–2, in one embodiment the vacuum actuated control mechanism 40 of this invention includes first and second vacuum actuators 50, 60, first and second connecting means 70, 80 for operatively connecting the first and second vacuum actuators 50, 60 respectively to the device 30, the vacuum means 90 for providing a vacuum to the first and second vacuum actuators 50, 60, activating means 100 for selectively activating the first and second vacuum actuators 50, 60 and securing means 120 for securing the first and second vacuum actuators 50, 60 in place. By securing in place it is meant that first and second sides 52, 62 of the first and second vacuum actuators 50, 60 respectively are secured or locked in place and cannot be further adjusted while the securing means 120 is activated.

With continuing reference to FIGS. 1–2, any vacuum actuator chosen with sound engineering judgement is useful for this invention. In one embodiment, the first vacuum actuator 50 has a first connection port 51 for operative connection to the vacuum means 90 as shown in FIG. 2. The first connection port 51 may be connected to a first vacuum line 93. The first vacuum actuator 50 also has the first side 52 that moves in inward direction 53 as a vacuum is established inside the first vacuum actuator 50. A vacuum is established, as is commonly known in the art, by removing air from inside the first vacuum actuator 50. When a vacuum within the first vacuum actuator 50 is removed, that is air is permitted to enter the first vacuum actuator 50, the first side 52 moves in outward direction 54. Therefore, the first vacuum actuator 50 can be initiated by either establishing a vacuum within or removing a vacuum from the first vacuum actuator 50. The first side 52 of the first vacuum actuator 50 will move accordingly. Such movement of the first side 52 of the first vacuum actuator 50 can be used in controlling the device 30 as will be discussed further below. It should be understood that the second vacuum actuator 60 has a second connection port 61 and the second side 62 that is similarly constructed and operated. In other words, the second connection port 61 may be connected to a second vacuum line 94 and the second side 62 of the second vacuum actuator 60 moves in inward direction 63 as a vacuum is established inside the second vacuum actuator 60 and moves in outward direction 64 when a vacuum is removed.

Referring now to FIG. 2, the first and second connecting means 70, 80 can be of any type choose with sound engineering judgement that are able to receive and transmit both tensile and compressive forces. The first and second connecting means 70, 80 are operatively connected to the first and second sides 52, 62 of the first and second vacuum actuators 50, 60. The first and second connecting means 70, 80 are also operatively connected to the device 30. The movement of the first side 52 of the first vacuum actuator 50 will be transmitted to the first connecting means 70. Similarly, the movement of the second side 62 of the second vacuum actuator 60 will be transmitted to the second connecting means 80. Thus, for example, when the first side 52 of the first vacuum actuator 50 is moved in inward direction 53 the first connecting means 70 will also tend to move in the inward direction 53. The motion of the first and second connecting means 70, 80 is transmitted to the device 30 as will be discussed further below.

With reference now to FIGS. 1–2, in the preferred embodiment the engine 14 of the riding mower 10 comprises the intake manifold 92 as is commonly known in the art. The intake manifold 92 is preferably used as the vacuum means 90 for providing a vacuum to the first and second vacuum actuators 50, 60. In this way, as long as the engine 14 of the riding mower 10 is running there is a vacuum means 90 available for the vacuum actuated control mechanism 40. It should be noted that other vacuum means, such as a vacuum pump (not shown), can be used with this invention. This is especially useful when the engine is not an internal combustion engine but instead is, for example, an electric motor. A vacuum source line 91 communicates the intake manifold 92 to the activating means 100 as will be discussed further below.

Still referring to FIGS. 1–2, the activating means 100 used to selectively activate the first and second vacuum actuators 50, 60 can be of any type chosen with sound engineering judgement. In this preferred embodiment, the activating means 100 includes a rocking switch 102 and first and second switching means 110, 111. The activating means 100 also includes the vacuum source line 91 that communicates a vacuum from the intake manifold 92 to the first and second switching means 110, 111 and a third vacuum line 95 that communicates vacuum from the first switching means 110 to the first vacuum line 93 and a fourth vacuum line 96 that communicates vacuum from the second switching means 111 to the second vacuum line 94.

With continuing reference to FIGS. 1–2, the rocking switch 102 can be of any type chosen with sound engineering judgement but in the preferred embodiment it includes first and second inner rocking switches 128, 129. The inner rocking switches may also be of any type chosen with sound engineering judgment such as air valves or electric switches 130, 131. The rocking switch 102 also includes a rocking button 103. The rocking button 103 is preferably mounted to the control panel 12 of the riding mower 10 and has first and second ends 104, 105 and a bottom 106. The rocking button 103 can be rocked, that is, pivoted about its bottom 106. The first electric switch 130 has a first tip 132. When the first tip 132 is pressed the first electric switch 130 is closed as is known in the art. Similarly, when the second tip 133 of the second electric switch 131 is pressed the second electric switch 131 is closed. To operate the rocking switch 102, an operator presses the rocking button 103. For example, when the operator presses the first end 104 of the rocking button 103 the first tip 132 of the first electric switch 130 is pressed thereby closing the first electric switch 130. Should the operator then refrain from pressing the rocking button 103, the rocking button 103 rocks about the bottom 106 (in a clockwise direction as seen in FIG. 2) permitting the first tip 132 of the first electric switch 130 to lift thereby opening the first electric switch 130. It should be understood that the second electric switch 131 operates similarly with the second end 105 of the rocking button 103.

With reference now to FIG. 2, the first and second switching means 110, 111 preferably include a first solenoid valve 112 and a second solenoid valve 113 respectively. The first and second solenoid valves 112, 113, as is commonly known in the art activate, that is open and close, in response to an electric signal. The first and second solenoid valves 112, 113 have first and second openings 114, 115 that permit ambient air to enter the system when the first and second solenoid valves 112, 113 are opened. This embodiment includes a power source 140 that is preferably operatively associated with the engine 14 of the riding mower 10, shown in FIG. 1. Wiring 141 is used to connect the power source 140 to the rocking switch 102. Additional wiring 141 connects the rocking switch 102 to the first and second switching means 110, 111 and the securing means 120 as will be discussed further below. A ground 142 completes the electric circuit as is commonly known in the art.

With continuing reference to FIG. 2, the securing means 120 used to secure the first and second vacuum actuators 50, 60 can be of any type chosen with sound engineering judgement that secures, that is locks, the first and second vacuum actuators 50, 60 in place. In other words, when the securing means 120 is activated the first and second side 52, 62 of the first and second vacuum actuators 50, 60 cannot move in either the inward direction (53 and 63 respectively) or in the outward direction (54 and 64 respectively). When the first and second vacuum actuators 50, 60 are secured in place, the first and second connecting means 70, 80 are also secured in place. This in turn secures the device 30 in place such that the device 30 cannot be moved. In the preferred embodiment, the securing means 120 includes third and fourth switching means 116, 117 such as third and fourth solenoid valves 121, 122. The third and fourth solenoid valves 121, 122, as is commonly known in the art, activate that is open and close, in response to an electric signal. When the third solenoid valve 121 is closed airflow between the first vacuum line 93 and the third vacuum line 95 is prevented. Similarly, when the fourth solenoid valve 122 is closed airflow is prevented between the second vacuum line 94 and the fourth vacuum line 96. In other words, when the third and fourth solenoid valves 121, 122 are closed the first and second vacuum actuators 50, 60 are secured in place thereby securing the device 30 from any motion. When the third solenoid valve 121 is opened, airflow is permitted between the first vacuum line 93 and the third vacuum line 95. The fourth solenoid valve 122 operates similarly.

With reference now to FIGS. 1–2, the operation of the vacuum actuated control mechanism 40 will now be discussed. In particular, the vacuum actuated control mechanism 40 will be used to control the motion of the device 30. In this embodiment, the device 30 is a pivotable lever attached to the frame 13 of the riding mower 10 by way of pivot point 31. Therefore, the vacuum actuated control mechanism 40 will either secure the device 30 in place as shown in FIG. 2, pivot the device 30 in a clockwise direction 32 about the pivot point 31 or pivot the device 30 in counterclockwise direction 33 about the pivot point 31. It is to be understood, as noted above, that the vacuum actuated control mechanism 40 of this invention can be used to control the motion of any lever, cable, rod, or device chosen with sound engineering judgement. The vacuum actuated control mechanism 40 may be selectively positioned into any one of three positions.

Still referring to FIGS. 1–2, the first position of the vacuum actuated control mechanism 40 is considered the secured position. The secured position is shown in FIG. 2. In particular, it should be noted that when in the secured position, the rocking button 103 is positioned such that neither the first nor the second electric switch 130, 131 is closed. This is the position taken by the rocking switch 102 whenever the operator is not pressing the rocking button 103. Therefore, an electric signal from the power source 40 is not provided to any of the first, second, third, or fourth solenoid valves 112, 113, 121, 122. This means that the third and fourth solenoid valves 121, 122 are closed and therefore airflow is prevented between the first and third vacuum lines 93, 95 as well as between the second and fourth vacuum lines 94, 96. Therefore, neither the first side 52 of the first vacuum actuator 50 nor the second side 62 of the second vacuum actuator 60 can move. Thus, the first and second connecting means 70, 80 are secured in place and the device 30 is similarly secured in place. In other words, the device 30 cannot be moved.

With continuing reference to FIGS. 1–2, the second position of the vacuum actuated control mechanism 40 will now be discussed. The second position occurs when the operator presses the first end 104 of the rocking button 103 thereby pressing the first tip 132 of the first electric switch 130 and therefore closing the first electric switch 130. This enables an electric signal to proceed from the power source 140 through the first electric switch 130, to the first, third and fourth solenoid valves 112, 121, 122. This opens the third and fourth solenoid valves 121, 122 permitting airflow between the first and second vacuum actuators 50, 60 and the first and second solenoid valves 112, 113. The electric signal received by the first solenoid valve 112 opens the first solenoid valve 112 thereby connecting the first openings 114 of the first solenoid valve 112 to the first vacuum actuator 50. This allows ambient air to move into the first vacuum actuator 50 thereby forcing the first side 52 in the outward direction 54. When in this second position, the second solenoid valve 113 does not receive an electric signal and therefore does not open. This means that the vacuum means 90 is still communicated to the second vacuum actuator 60 causing the second side 62 to move in inward direction 63. The result is that the first connecting means 70 is moved in outward direction 54 while the second connecting means 80 is moved in inward direction 63. This causes the device 30 to pivot about the pivot point 31 in counter clockwise direction 33. Should the operator stop pressing the rocking button 103, the device 30 would be secured in place no matter what position it was in at the time the operator stopped pressing the rocking button 103.

With continuing reference to FIGS. 1–2, the third position of the vacuum actuated control mechanism 40 will now be discussed. The third position occurs when the operator presses the second end 105 of the rocking button 103 thereby pressing the second tip 133 of the second electric switch 131 and therefore closing the second electric switch 131. This enables an electric signal to proceed from the power source 140 through the second electric switch 131, to the second, third and fourth solenoid valves 113, 121, 122. This opens the third and fourth solenoid valves 121, 122, as noted above, permitting airflow between the first and second vacuum actuators 50, 60 and the first and second solenoid valves 112, 113. The electric signal received by the second solenoid valve 113 opens the second solenoid valve 113 thereby connecting the second openings 115 of the second solenoid valve 113 to the second vacuum actuator 60. This allows ambient air to move into the second vacuum actuator 60 thereby forcing the second side 62 in the outward direction 64. When in this third position, the first solenoid valve 112 does not receive an electric signal and therefore does not open. This means that the vacuum means 90 is still communicated to the first vacuum actuator 50 causing the first side 52 to move in inward direction 53. The result is that the second connecting means 80 is moved in outward direction 64 while the first connecting means 70 is moved in inward direction 53. This causes the device 30 to pivot about the pivot point 31 in clockwise direction 32. As noted above, should the operator stop pressing the rocking button 103 the device 30 would be secured in place no matter what position it was in at the time the operator stopped pressing the rocking button 103.

Figure 7:
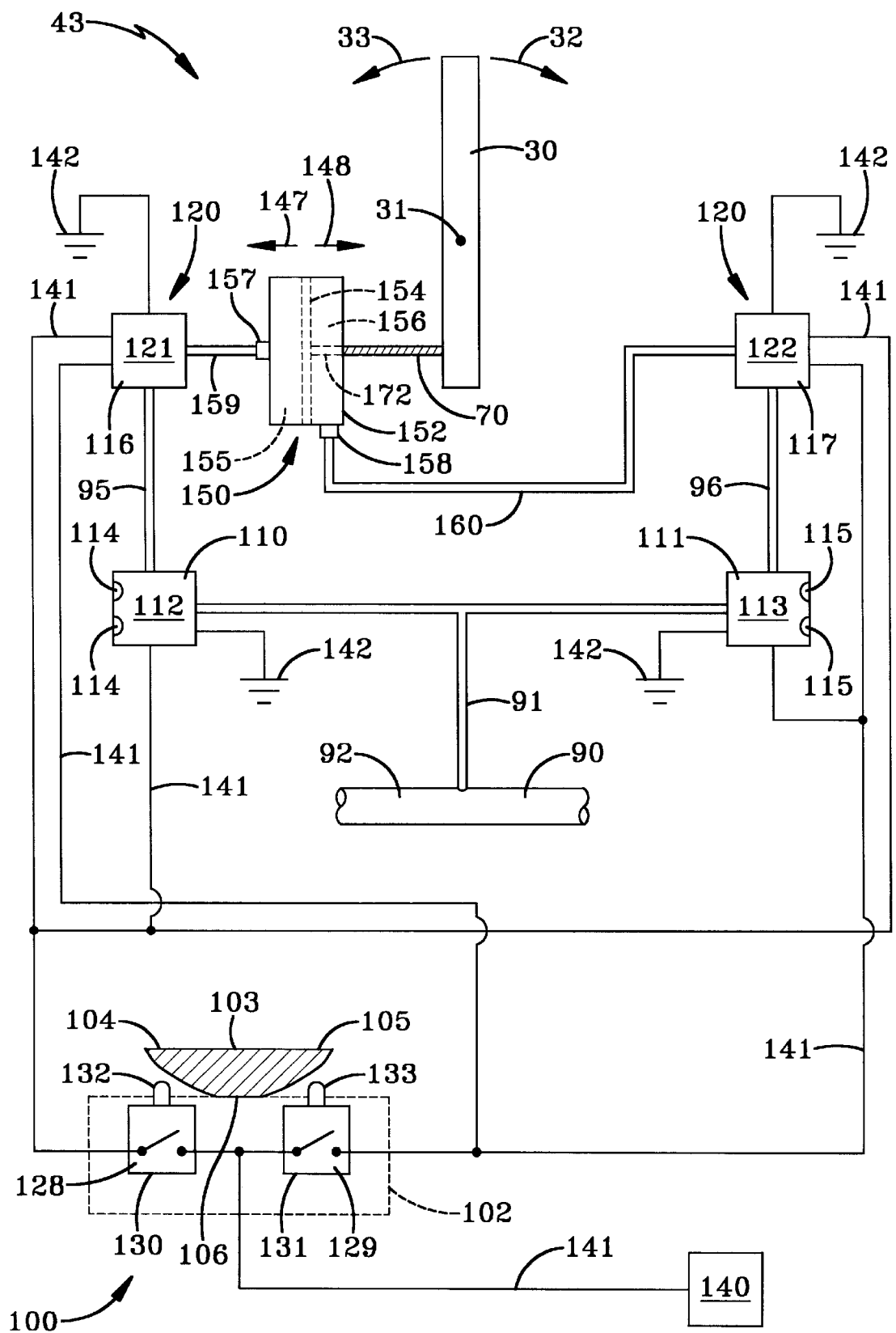
FIG. 7 is a schematic representation of an alternate vacuum actuated control mechanism showing how a single double acting vacuum actuator can be used to control the device.

With reference now to FIG. 7, an alternate embodiment will now be disclosed. FIG. 7 illustrates a vacuum actuated control mechanism 43 using only a single double acting vacuum actuator 150. The double acting vacuum actuator 150 has a body 152 with a membrane 154 located therein. The membrane 154 is sealingly connected to the interior walls of the body 152 yet can be selectively moved in either first or second directions 147, 148. By sealingly connected it is meant that air cannot pass through or around the membrane 154 within the body 152 of the double acting vacuum actuator 150. The membrane 154 divides the double acting vacuum actuator 150 into first and second chambers 155, 156. First and second connection ports 157, 158 connect the first and second chambers 155, 156 to first and second vacuum lines 159, 160 respectively. Fixedly connected to the membrane 154 is an actuator rod 172 that extends external to the body 152 of the double acting vacuum actuator 150 and is operatively connected to the first connecting means 70.

With reference to FIGS. 1 and 7, the operation of the vacuum actuated control mechanism 43 shown in FIG. 7 is similar to the operation of the vacuum actuated control mechanism 40 shown in FIG. 2. When in a secured position, shown in FIG. 7, an electric signal from the power source 40 is not provided to any of the first, second, third, or fourth solenoid valves 112, 113, 121, 122. This means that the third and fourth solenoid valves 121, 122 are closed and therefore airflow is prevented between the first and third vacuum lines 159, 95 as well as between the second and fourth vacuum lines 160, 96. Therefore, the membrane 154 and the actuator rod 172 cannot move. Thus, the first connecting means 70 is secured in place and the device 30 is similarly secured in place.

With reference again to FIG. 7, the second position occurs when the operator presses the first end 104 of the rocking button 103 thereby pressing the first tip 132 of the first electric switch 130 and therefore closing the first electric switch 130. This enables an electric signal to proceed from the power source 140 through the first electric switch 130, to the first, third and fourth solenoid valves 112, 121, 122. This opens the third and fourth solenoid valves 121, 122 permitting airflow between the first and second chambers 155, 156 of the double acting vacuum actuator 150 and the first and second solenoid valves 112, 113 respectively. The electric signal received by the first solenoid valve 112 opens the first solenoid valve 112 thereby connecting the first openings 114 of the first solenoid valve 112 to the first chamber 155. This allows ambient air to move into the first chamber 155 thereby forcing the membrane 154 in the second direction 148. When in this second position, the second solenoid valve 113 does riot receive an electric signal and therefore does not open. This means that the vacuum means 90 is still communicated to the second chamber 156 also causing the membrane 154 to move in the second direction 148. The result is that the first connecting means 70 is moved in the second direction 148 causing the device 30 to pivot about the pivot point 31 in counter clockwise direction 33.

With continuing reference to FIG. 7, the third position occurs when the operator presses the second end 105 of the rocking button 103 thereby pressing the second tip 133 of the second electric switch 131 and therefore closing the second electric switch 131. This enables an electric signal to proceed from the power source 140 through the second electric switch 131, to the second, third and fourth solenoid valves 113, 121, 122. This opens the third and fourth solenoid valves 121, 122, as noted above, permitting airflow between the first and second chambers 155, 156 and the first and second solenoid valves 112, 113 respectively. The electric signal received by the second solenoid valve 113 opens the second solenoid valve 113 thereby connecting the second openings 115 of the second solenoid valve 113 to the second chamber 156. This allows ambient air to move into the second chamber 156 thereby forcing the membrane in the first direction 147. When in this third position, the first solenoid valve 112 does not receive an electric signal and therefore does not open. This means that the vacuum means 90 is still communicated to the first chamber 155 causing the membrane 154 to move in the first direction 147. The result is that the first connecting means 70 is moved in the first direction 147 causing the device 30 to pivot about the pivot point 31 in clockwise direction 32. Should the operator stop pressing the rocking button 103 the device 30 would be secured in place no matter what position it was in at the time the operator stopped pressing the rocking button 103.

With reference to FIGS. 1–6, now that the operation of the vacuum actuated control mechanisms 40, 43 have been discussed with regard to a general use, that is to control a generic device 30, two specific uses will now be disclosed. First a vacuum actuated control mechanism 41 for use in controlling the height of the mower deck 20 will be described. Then three vacuum actuated control mechanisms 42 (42*a*, 42*b*, 42*c*) for use in controlling the speed of the riding mower 10 will be described. It should be noted that the basic operation of the vacuum actuated control mechanisms 41, 42 is similar to that of the previously described vacuum actuated control mechanism 40 or alternately the previously described vacuum actuated control mechanism 43.

Figure 3:
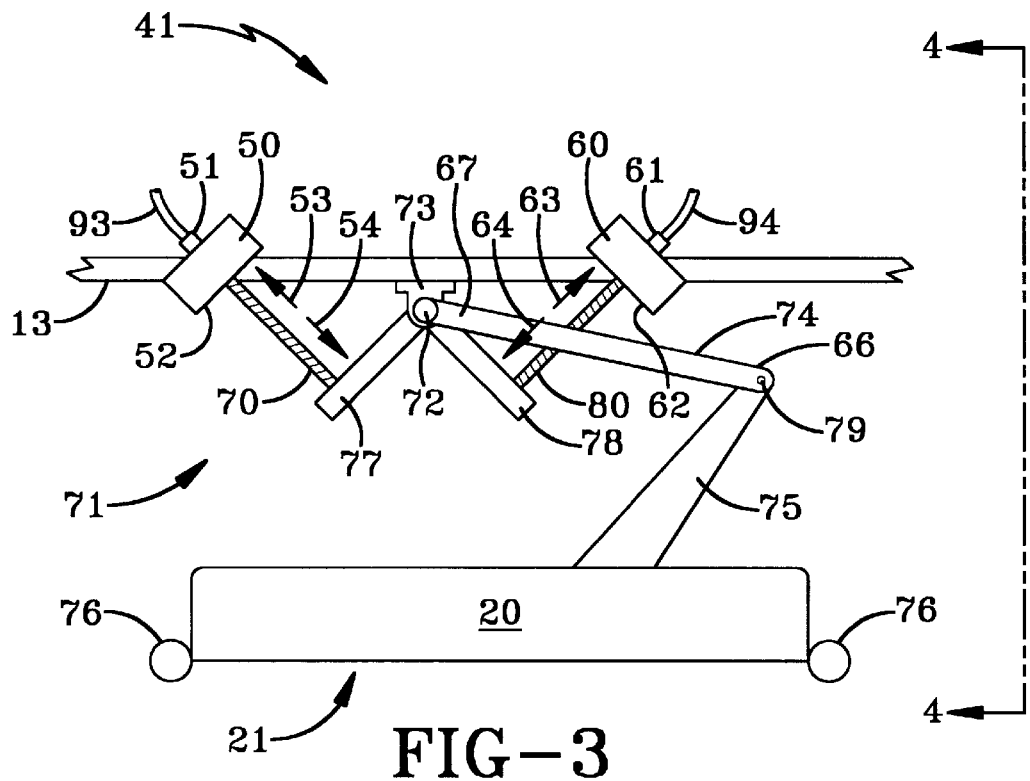
FIG. 3 is an elevation view showing how a vacuum actuated control mechanism can be used to adjust the height of a mower deck.
Figure 4:
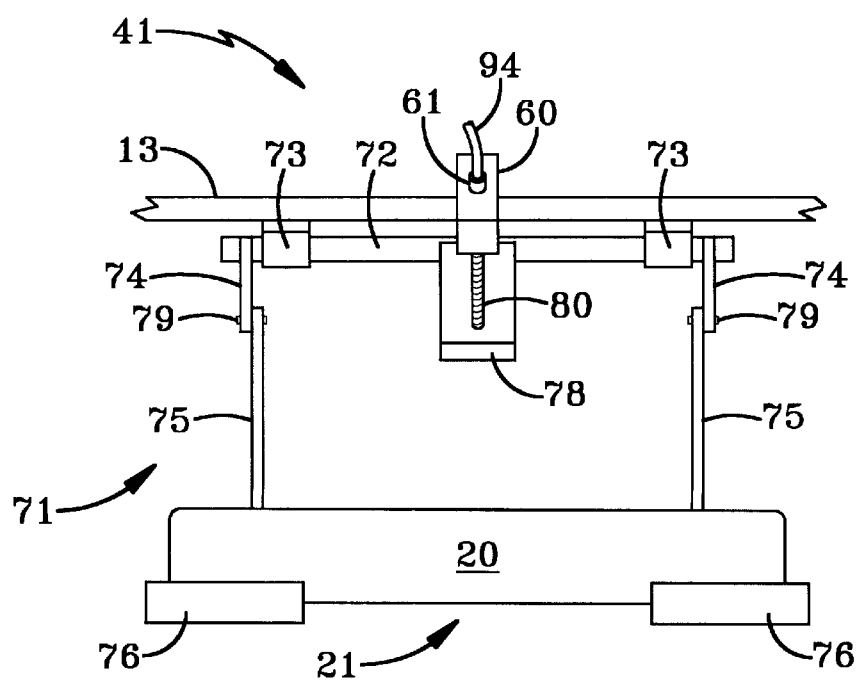
FIG. 4 is an end view of the vacuum actuated control mechanism taken along the line 4—4 of FIG. 3.
Figure 5:
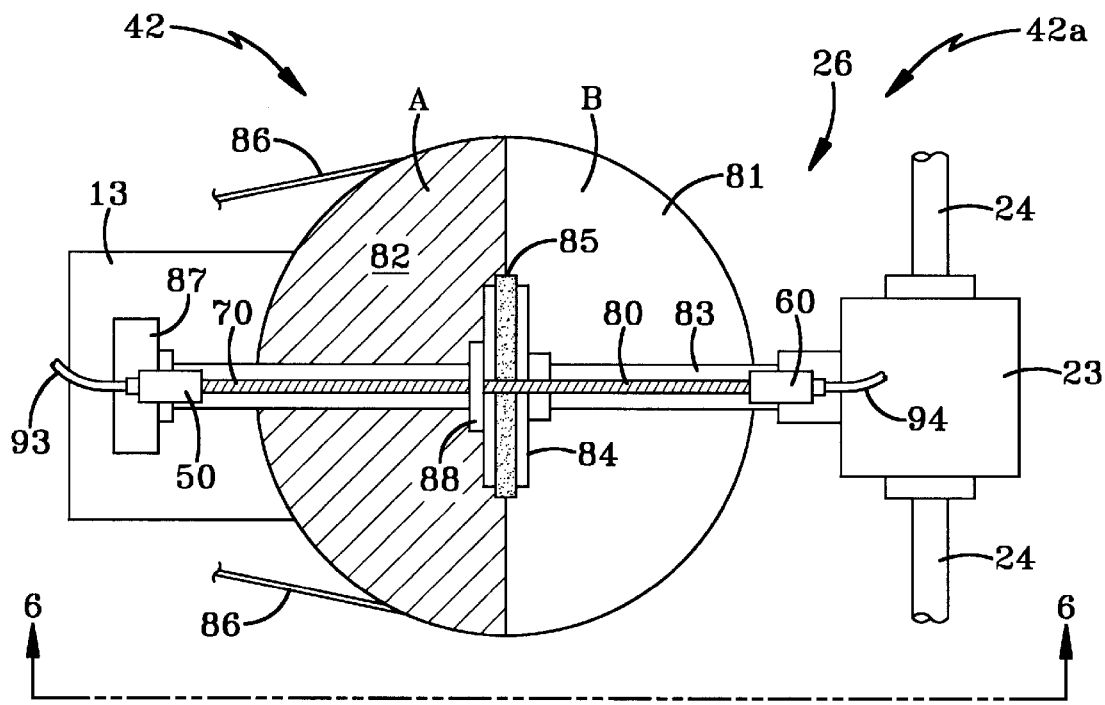
FIG. 5 is a plan view of a vacuum actuated control mechanism used to control the speed of a riding lawn mower that has a frictional drive system.

With reference now to FIGS. 14, the mower deck 20 can be supported to the frame 13 of the riding mower 10 by any means chosen with sound engineering judgement. Though a specific lift assembly 71 will be herein described, it is to be understood that this invention is applicable with many lift assemblies. The lift assembly 71 is used to connect the mower deck 20 to the frame 13 of the riding mower 10 and to lift the mower deck 20 for height adjustment as is commonly known in the art. Fixedly attached to the mower deck 20 are deck brackets 75. Deck lift members 74 have first ends 66 that are rotatably connected to the deck brackets 75 using pins 79. The deck lift members 74 also have second ends 67 that are fixedly attached to a deck shaft 72. The deck shaft 72 is rotatably connected to the frame 13 of the riding mower 10 using pillow blocks 73. To raise the height of the mower deck 20 it is only necessary to rotate the deck shaft 72 in a counterclockwise direction as shown in FIG. 3. This causes the first end 66 of the deck lift member 74 to move upward toward the frame 13 of the riding mower 10 thereby lifting through the deck bracket 75 the mower deck 20. To lower the mower deck 20 it is only necessary to rotate the deck shaft 72 in a clockwise direction as shown in FIG. 3. This causes the first end 66 of the deck lift member 74 to move downward away from the frame 13 of the riding mower 10. This causes the mower deck 20 to lower as is commonly known in the art.

With continuing reference to FIGS. 1–4, the vacuum actuated control mechanism 41 can be used to raise and lower the height of the mower deck 20. First and second vacuum lift arms 77, 78 are fixedly attached to the deck shaft 72. The first connecting means 70 is operatively connected to the first vacuum lift arm 77 and the second connecting means 80 is operatively connected to the second vacuum lift arm 78. To raise the height of the mower deck 20 the operator presses the first end 104 of the rocking button 103. This closes the first electric switch 130 permitting an electric signal to activate the third and fourth solenoid valves 121, 122 as well as the first solenoid valve 112. When the third and fourth solenoid valves are activated they then permit air flow between the first and second vacuum actuators 50, 60 and the first and second solenoid valves 112, 113 respectively. When the first solenoid valve 112 is activated it permits ambient air to enter the first vacuum actuator 50. This removes the vacuum from the first vacuum actuator 50 and causes the first side 52 to move in outward direction 54. This causes the first connecting means 70 to also move in outward direction 54 thereby applying a force to the first vacuum lift arm 77 in order to cause the deck shaft 72 to rotate in counterclockwise direction as shown in FIG. 3.

Still referring to FIGS. 1–4, it should be noted that when the operator presses the first end 104 of the rocking button 103 the second solenoid valve 113 is not activated. Thus, a vacuum is established within the second vacuum actuator 60. This causes the second side 62 of the second vacuum actuator 60 to move in inward direction 63. This causes the second connecting means to also move in inward direction 63. This in turn applies a force to the second vacuum lift arm 78 also causing the back shaft 72 in a counterclockwise direction as shown in FIG. 3. Thus the height of the mower deck 20 can be raised. Once the mower deck is at the appropriate height, the operator must only release the rocking button 103. This permits the first electric switch 130 to open. This stops the electric signal and activates the third and fourth solenoid valves 121, 122 such that air flow is prevented between the first and second vacuum actuators 50, 60 and the first and second solenoid valves 112, 113 respectively. This secures the first and second sides 52, 62 of the first and second vacuum actuators 50, 60 in place thereby securing the mower deck 20 at the selected height.

With continuing reference to FIGS. 1–4, to lower the height of the mower deck 20, the operator presses the second end 105 of the rocking button 103. The remaining operation of the vacuum actuated control mechanism 41 is similar to that described above except that the first and second vacuum actuator 50, 60 are operated in reverse thereby causing the deck shaft 72 to rotate in a clockwise direction as shown in FIG. 3. It should be noted that regardless of the specific position of the mower deck 20, when the operator stops pressing the rocking button 103 the mower deck 20 is secured in place. In other words, to maintain the mower deck 20 at a given height it is only necessary to stop pressing the rocking button 103. It should be understood that in an alternate embodiment the vacuum actuated control mechanism 41 may use a single double acting vacuum actuator 150 as shown in FIG. 7 and described above. In this case, the actuator rod 172 may be operatively connected through the first connecting means 70 to the first vacuum lift arm 77 making both the second connecting means 80 and the second vacuum lift arm 78 unnecessary.

With reference now to FIGS. 1–2 and 5–6, the vacuum actuated control mechanism 42 is used to control the speed of the riding mower 10. Three different embodiments of this vacuum actuated control mechanism 42 will be disclosed herein. The vacuum actuated control mechanism 42*a* is for use with a frictional drive system 26. In this case, the differential 23 is operatively connected to the drive axle 24 and then to the back wheels 16 in a manner commonly known in the art and therefore will not be described in detail. In this embodiment the frictional drive system 26 is used to selectively transfer power from the engine 14 to the differential 23. The frictional drive system 26 can be of any type chosen with sound engineering judgement. In this embodiment, the frictional drive system 26 includes the friction disc 81 that is operatively connected to the engine 14 using a drive belt 86. In this way the engine 14 can rotate the friction disc 81 in a manner commonly known in the art. The friction disc 81 is rotatively connected to the frame 13 using friction disc shaft 89. The friction ring 84 is operatively connected to a speed shaft 83 such that rotation of the friction ring 84 causes the speed shaft 83 to rotate in the same direction. The friction ring 84 can also move axially along the speed shaft 83. The speed shaft 83 is operatively connected to a bearing 87 and to the differential 23. Rotation of the speed shaft 83 is transmitted to the differential 23 thereby causing the rotation of the drive axle 24 as is commonly known in the art. Rotation of the friction disc 81 is transferred to the friction ring 84 as will now be discussed.

With continuing reference to FIGS. 1–2 and 5–6, the friction ring 84 has a friction edge 85 used to operatively connect to a friction surface 82 of the friction disc 81. The friction edge 85 should be formed of a material such as rubber that can maximize the frictional contact between the friction ring 84 and the friction surface 82 of the friction disc 81. It should be noted that the position of the friction ring 84 with respect to the friction disc 81 determines the speed of the rotation of the speed shaft 83 transferred to the differential 23. Thus the closer the friction ring 84 is to the circumference of the friction disc 81 the greater the speed of rotation transmitted therethrough. It should also be noted that the direction of rotation of the friction ring 84 will depend on the location of the friction edge 85 on the friction surface 82 of the friction disc 81. In particular, when the friction edge 85 is in contact with the area of the friction surface denoted as A and shown shaded in FIG. 5, the friction ring 84 will rotate in a first direction. When, on the other hand, the friction edge 85 is in contact with the area of the friction surface 82 denoted as area B in FIG. 5 the friction ring 84 will rotate in an opposite direction. These different directions of rotation of the friction ring 84 are then transmitted to the speed shaft 83 and on to the drive axle 24 providing both forward and backward directions of movement for the riding mower 10. To move the friction ring 84 along the axis of the speed shaft 83 and therefore also along the friction surface 82 of the friction disc 81, the friction ring 84 has a friction ring extension 88 that is operatively connected to the vacuum actuated control mechanism 42a.

Figure 6:
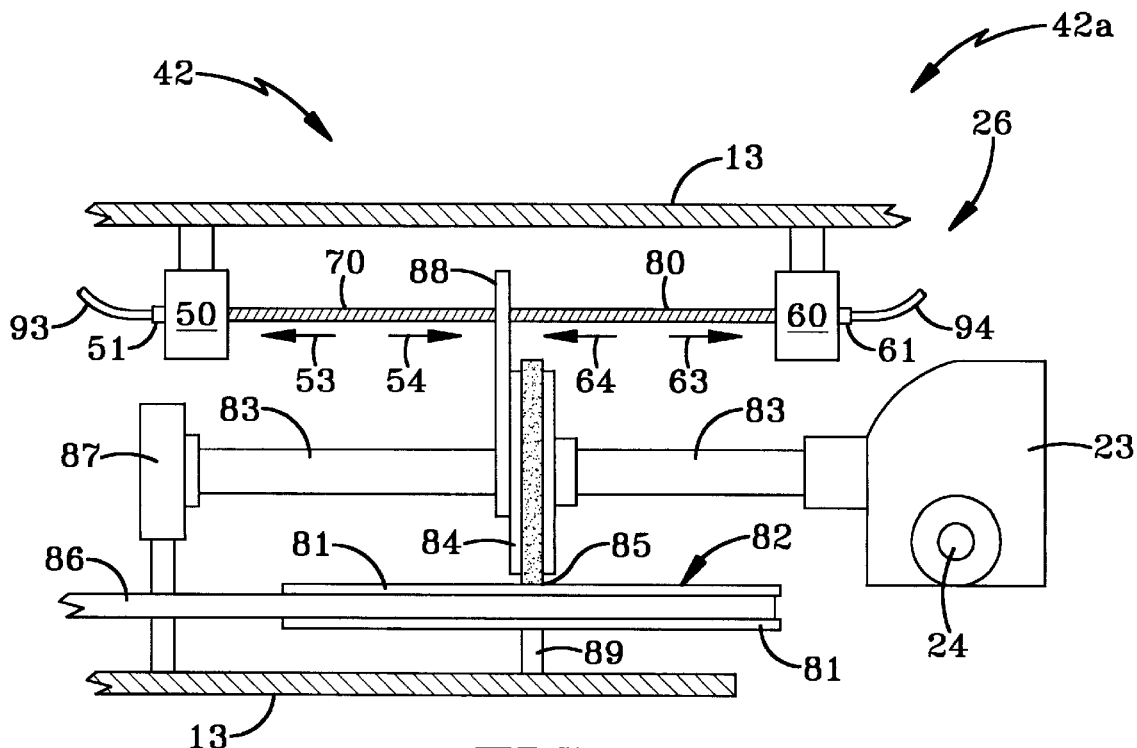
FIG. 6 is an elevation view of the vacuum actuated control mechanism taken along the line 6—6 of FIG. 5.

Still referring to FIGS. 1–2 and 5–6, to control the speed of the riding mower 10, for example to move the friction ring 84 towards the outer circumferencial edge of the friction surface 82 denoted as area B, the operator presses the first end 104 of the rocking button 103. This closes the first electric switch 130 permitting an electric signal to activate the third and fourth solenoid valves 121, 122 as well as the first solenoid valve 112. When the third and fourth solenoid valves are activated they then permit air flow between the first and second vacuum actuators 50, 60 and the first and second solenoid valves 112, 113 respectively. When the first solenoid valve 112 is activated it permits ambient air to enter the first vacuum actuator 50. This removes the vacuum from the first vacuum actuator 50 and causes the first side 52 to move in outward direction 54. This causes the first connecting means 70 to also move in outward direction 54 thereby applying a force to the friction ring 84 through the friction ring extension 88. This force causes the friction ring 84 to move along the speed shaft 83 in a rightward direction as shown in FIG. 6. It should be noted that when the operator presses the first end 104 of the rocking button 103 the second solenoid valve 113 is not activated. Thus, a vacuum is established within the second vacuum actuator 60. This causes the second side 62 of the second vacuum actuator 60 to move in inward direction 63. This causes the second connecting means to also move in inward direction 63. This in turn applies a force to the friction ring 84 also causing the friction ring 84 to move along the speed shaft 83 in a rightward direction as shown in FIG. 6. In this way the speed of the riding mower 10 can be controlled. Once the riding mower 10 is operating at the appropriate speed, the operator must only release the rocking button 103. This permits the first electric switch 130 to open. This stops the electric signal and activates the third and fourth solenoid valves 121, 122 such that air flow is prevented between the first and second vacuum actuators 50, 60 and the first and second solenoid valves 112, 113 respectively. This secures the first and second sides 52, 62 of the first and second vacuum actuators 50, 60 in place thereby securing the riding mower 10 at the selected speed.

With continuing reference to FIGS. 1–4, to move the friction ring 84 towards the outer circumferencial edge of the friction surface 82 denoted as area A, the operator presses the second end 105 of the rocking button 103. The remaining operation of the vacuum actuated control mechanism 42a is similar to that described above except that the first and second vacuum actuator 50, 60 are operated in reverse thereby causing the friction ring 84 to move along the speed shaft 83 in a leftward direction as shown in FIG. 6. It should be noted that regardless of the specific position of the friction ring 84, when the operator stops pressing the rocking button 103 the friction ring 84 is secured in place. In other words, to maintain the mower deck 20 at a given speed it is only necessary to stop pressing the rocking button 103. It should be understood that in an alternate embodiment the vacuum actuated control mechanism 42a may use a single double acting vacuum actuator 150 as shown in FIG. 7 and described above. In this case, the actuator rod 172 may be operatively connected through the first connecting means 70 to the friction ring extension 88 making the second connecting means 80 unnecessary.

Figure 8:
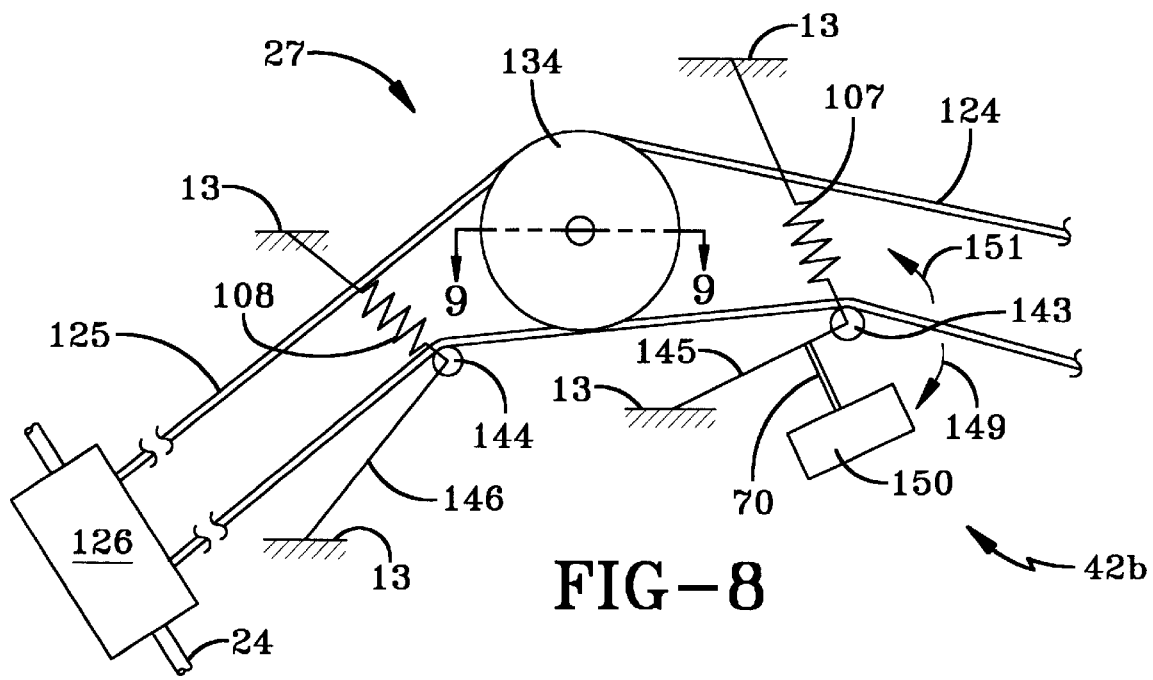
FIG. 8 is a plan view of a vacuum actuated control mechanism used to control the speed of a riding lawn mower that has a variable speed drive system.
Figure 9:
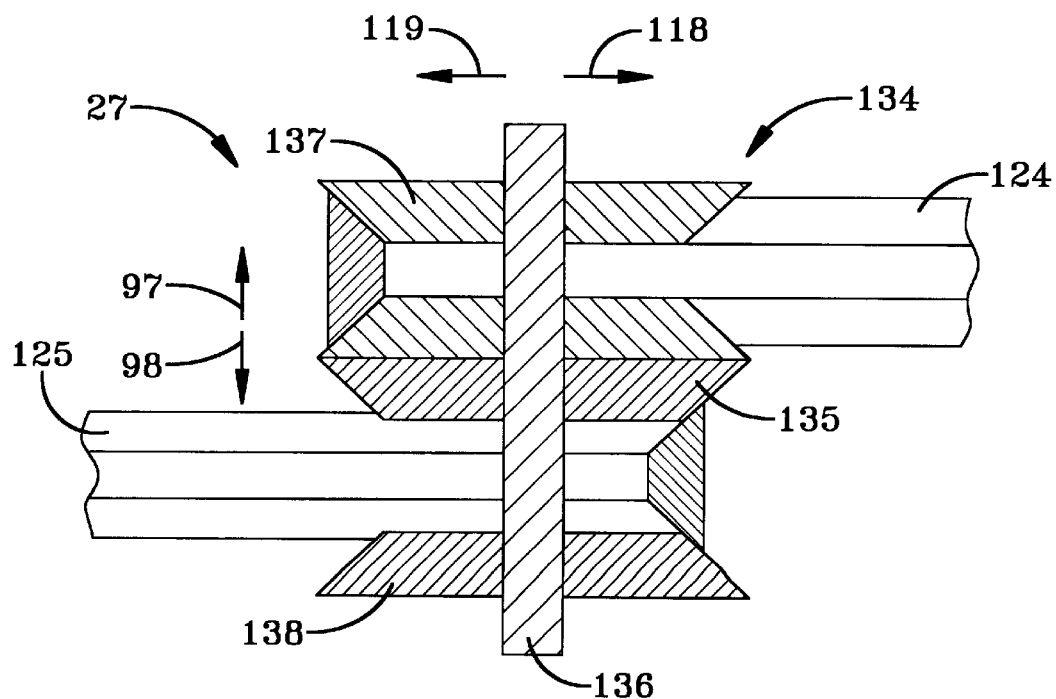
FIG. 9 is an enlarged sectional view taken along the line 9—9 of FIG. 8 showing the adjustable half pulley, the top pulley piece and the bottom pulley piece.

With reference now to FIGS. 1 and 8–9, the vacuum actuated control mechanism 42b is for use with a variable speed drive system 27. A first belt 124 operatively connects a drive pulley (not shown) to a double pulley 134. A second belt 125 operatively connects the double pulley 134 to the drive axle 24. Between the double pulley 134 and the drive axle 24 may be conversion means 126 for converting the rotation of the second belt 125 to rotation of the drive axle 24. Such conversion means 126 can be of any type commonly known in the art such as a transmission or a differential. Various types of conversion means 126 are well known in the art and thus will not be discussed further. The double pulley 134 includes an adjustable half pulley 135 rotatably and slidably positioned on a pulley rod 136 between top and bottom pulley pieces 137, 138. The first belt 124 is operatively received between the top pulley piece 137 and the adjustable half pulley 135. Similarly, the second belt 125 is operatively received between the bottom pulley piece 138 and the adjustable half pulley 135. First and second idler pulleys 143, 144 are used to maintain the belt pressures of the first and second belts 124, 125 respectively as is commonly known in the art. The first and second idler pulleys 143, 144 are rotatably mounted to first and second idler levers 145, 146 that are pivotably attached to the frame 13 of the riding mower 10. First and second springs 107, 108 hold the first and second idler pulleys 143, 144 with a predetermined force against the first and second belts 124, 125.

With continuing reference to FIGS. 1 and 8–9, decreasing the belt pressure of the first belt 124, as by for example moving the first idler pulley 143 in first direction 149 (shown in FIG. 8), will force the adjustable half pulley 135 to move in first direction 97 (shown in FIG. 9). This, in turn, causes the first belt 124 to move toward the outer portion of the top pulley piece 137 thereby increasing the effective diameter of the first belt 124 about the double pulley 134. At the same time, the second belt 125 moves toward the inner portion of the bottom pulley piece 138 thereby decreasing the effective diameter of the second belt 125 about the double pulley 134. This is the condition shown in FIG. 9. As can be easily understood by those of ordinary skill in the art, this condition decreases the speed of rotation of the second belt 125 thereby providing decreased speed for the drive axle 24 and thus the riding mower 10. Similarly, increasing the belt pressure of the first belt 124, as by for example moving the first idler pulley 143 in second direction 151 (shown in FIG. 8), will force the adjustable half pulley 135 to move in second direction 98 (shown in FIG. 9). This, in turn, causes the first belt 124 to move toward the inner portion of the top pulley piece 137 thereby decreasing the effective diameter of the first belt 124 about the double pulley 134. At the same time, the second belt 125 moves toward the outer portion of the bottom pulley piece 138 thereby increasing the effective diameter of the second belt 125 about the double pulley 134. This condition increases the speed of rotation of the second belt 125 thereby providing increased speed for the drive axle 24 and thus the riding mower 10.

With reference now to FIGS. 1–2 and 8–9, the vacuum actuated control mechanism 42b can be used with the variable speed drive system 27 by connecting the double acting vacuum actuator 150 to the first idler lever 145 through the first connecting means 70 as shown in FIG. 8. As vacuum is selectively established and removed from inside the double acting vacuum actuator 150, the first idler pulley 143 is moved in first and second directions 149, 151 thereby decreasing and increasing the belt pressure of the first belt 124. The remaining operation of the vacuum actuated control mechanism 42b and the variable speed drive system 27 is similar to that described above. It should be understood that alternately, first and second vacuum actuators 50, 60 (shown in FIG. 2) could be used to pivot the first idler lever 145 in a similar manner.

With continuing reference to FIGS. 1–2 and 8–9, it should also be understood that other means for adjusting the belt pressures are possible with the vacuum actuated control mechanism 42b. For example, either the first and second vacuum actuators 50, 60 or the double acting vacuum actuator 150 could be operatively connected to the second idler lever 146 for use in selectively moving the second idler pulley 144 relative to the second belt 125. This would cause the adjustable half pulley 135 to move thereby controlling the speed of the riding mower 10 as described above. For another example, either the first and second vacuum actuators 50, 60 or the double acting vacuum actuator 150 could be operatively connected to the pulley rod 136 for use in selectively moving the pulley rod 136 in either first or second directions 118, 119 (shown in FIG. 9). Moving the pulley rod 136 in the first direction 118 would decrease the belt pressure of the first belt 124 and lead to a decreased speed for the riding mower 10 as described above. Similarly, moving the pulley rod 136 in the second direction 119 would increase the belt pressure of the first belt 124 and lead to a increased speed for the riding mower 10 as described above With reference now to FIGS. 1 and 10, the vacuum actuated control mechanism 42c is for use with a hydrostatic speed drive system 28. In this case, a drive pulley 174 that is rotated by the engine 14 in a manner well known in the art, rotates a hydrostatic shaft 175 that is operatively connected to a hydrostatic transmission 176. The hydrostatic transmission 176 translates the rotation of the hydrostatic shaft 175 into rotation of the drive axle 24. The hydrostatic transmission 176 can be of any type known in the art and its operation is well known in the art and thus will not be discussed in detail. It should be noted, however, that moving a hydrostatic lever 177 that is pivotably mounted to the hydrostatic transmission 176 in either first or second directions 178, 179 will adjust the speed of the drive axle 24.

Figure 10:
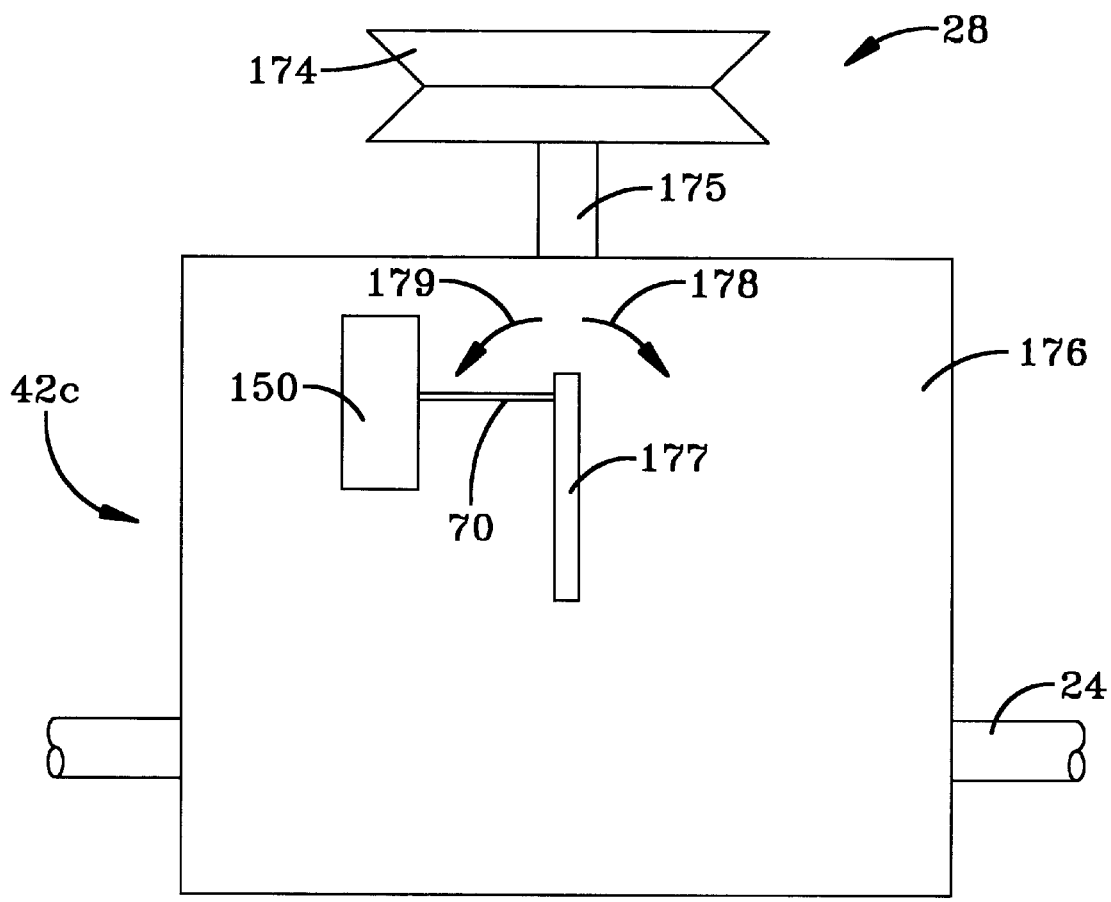
FIG. 10 is an elevation view of a vacuum actuated control mechanism used to control the speed of a riding lawn mower that has a hydrostatic speed drive system.

With continuing reference to FIGS. 1 and 10, the vacuum actuated control mechanism 42c can be used with the hydrostatic speed drive system 28 by connecting the double acting vacuum actuator 150 to the hydrostatic lever 177 through the first connecting means 70 as shown in FIG. 10. As vacuum is selectively established and removed from inside the double acting vacuum actuator 150, the hydrostatic lever 177 is pivoted in first and second directions 178, 179 thereby decreasing and increasing the speed of the drive axle 24. The remaining operation of the vacuum actuated control mechanism 42c is similar to that described above. It should be understood that alternately, first and second vacuum actuators 50, 60 (shown in FIG. 2) could be used to pivot the hydrostatic lever 177 in a similar manner.

The invention has been described with reference to a preferred embodiment. Obviously, modifications and alterations will occur to others upon a reading and understanding of this specification. It is intended to include all such modifications and alterations in so far as they come within the scope of the appended claims or the equivalents thereof.

Having thus described the invention, it is now claimed:

1. A vacuum actuated control mechanism for controlling an associated device, the vacuum actuated control mechanism comprising:
   a first vacuum actuator having first and second chambers separated by a movable membrane;
   first connecting means for operatively connecting said first vacuum actuator to the associated device:
   vacuum means for providing a vacuum to said first vacuum actuator;
   activating means for selectively activating said first vacuum actuator, wherein said activating means includes:
      first and second switching means for selectively permitting airflow between said first and second chambers and said vacuum means,
      a rocking switch for selectively activating said first and second switching means; and,
      vacuum lines for communicating said vacuum means to said first and second switching means and for communicating said first and second switching means to said first and second chambers; and
   securing means for securing said first vacuum actuator in place.

2. The vacuum actuated control mechanism of claim 1 wherein said securing means comprises:
   third and fourth switching means for selectively permitting airflow between said first and second chambers and said first and second switching means respectively, said rocking switch selectively activating said third and fourth switching means.

3. The vacuum actuated control mechanism of claim 2 wherein said rocking switch comprises:
   first and second inner rocking switches; and,
   a rocking button, said rocking button selectively activating said first and second inner rocking switches.

4. The vacuum actuated control mechanism of claim 3 wherein said first inner rocking switch selectively activates said first, third and fourth switching means.

5. The vacuum actuated control mechanism of claim 3 wherein said second inner rocking switch selectively activates said second, third and fourth switching means.

6. The vacuum actuated control mechanism of claim 1 further comprising:
   a second vacuum actuator; and,
   second connecting means for operatively connecting said second vacuum actuator to the associated device, said vacuum means providing a vacuum to said second vacuum actuator, said activating means selectively activating said second vacuum actuator, said securing means securing said second vacuum actuator in place.

7. A method for controlling an associated device, the method comprising the steps of:
   switching a first switch;
   activating a third valve thereby permitting airflow between said first chamber and said first valve;
   activating a fourth valve thereby permitting airflow between said second chamber and a second valve;

activating said first valve thereby permitting ambient air to enter said first chamber;

removing a vacuum from a first chamber of a vacuum actuator;

establishing a vacuum within a second chamber of said vacuum actuator; and, moving the associated device.

8. The method of claim 7 wherein, after the step of moving the associated device, the method comprises the steps of:

releasing said first switch;

activating said third and fourth valves thereby preventing airflow between said first and second chambers and said first and second valves respectively;

securing said vacuum actuator in place; and, securing the associated device in place.

9. A method for controlling an associated device, the method comprising the steps of:

switching a first switch;

activating a third valve thereby permitting airflow between said first vacuum actuator and said first valve;

activating a fourth valve thereby permitting airflow between said second vacuum actuator and a second valve;

activating said first valve thereby permitting ambient air to enter said first vacuum actuator;

removing vacuum from a first vacuum actuator;

establishing a vacuum within a second vacuum actuator; and, moving the associated device.

10. The method of claim 9 wherein, after the step of moving the associated device, the method comprises the steps of:

releasing said first switch;

activating said third and fourth valves thereby preventing airflow between said first and second vacuum actuators and said first and second valves respectively;

securing said first and second vacuum actuators in place; and, securing the associated device in place.

11. A method for controlling an associated device, the method comprising the steps of:

switching a first switch;

activating third and fourth valves thereby permitting airflow between first and second chambers of a vacuum actuator and first and second valves respectively;

activating said first valve thereby permitting ambient air to enter said first chamber;

removing a vacuum from said first chamber;

establishing a vacuum within said second chamber;

moving a membrane within said vacuum actuator in a first direction;

moving a first connecting means operatively connected to said membrane and to the associated device in said first direction;

moving the associated device;

releasing said first switch;

activating said third and fourth valves thereby preventing airflow between said first and second chambers and said first and second valves respectively;

securing said vacuum actuator in place; and, securing the associated device in place.

12. A vacuum actuated control mechanism for controlling the speed of a device having an engine, a drive axle for providing locomotion for the device and a drive system for selectively transferring power from said engine to said drive axle, the vacuum actuated control mechanism comprising:

a first vacuum actuator;

first connecting means for operatively connecting said first vacuum actuator to the drive system;

vacuum means for providing a vacuum to said first vacuum actuator;

activating means for selectively activating said first vacuum actuator; and, securing means for selectively securing said first vacuum actuator in place, said securing means also for selectively securing a constant speed for the drive axle.

13. The vacuum actuated control mechanism of claim 12 wherein said first vacuum actuator has first and second chambers separated by a movable membrane, said activating means including,
  (1) first and second switching means for selectively permitting airflow between said first and second chambers and said vacuum means,
  (2) a rocking switch for selectively activating said first and second switching means and,
  (3) vacuum lines for communicating said vacuum means to said first and second switching means and for communicating said first and second switching means to said first and second chambers respectively, said securing means including,
  (1) third and fourth switching means for selectively permitting airflow between said first and second chambers and said first and second switching means respectively, said rocking switch selectively activating said third and fourth switching means.

14. The vacuum actuated control mechanism of claim 13 wherein said rocking switch comprises:

first and second inner rocking switches, said first inner rocking switch selectively activating said first, third and fourth switching means, said second inner rocking switch selectively activating said second, third and fourth switching means; and, a rocking button, said rocking button selectively activating said first and second inner rocking switches.

* * * * *